United States Patent [19]
Areaux

[11] Patent Number: 5,984,999
[45] Date of Patent: Nov. 16, 1999

[54] APPARATUS HAVING GAS-ACTUATED PUMP AND CHARGE WELL AND METHOD OF MELTING METAL THEREWITH CHARGE A WELL OF A METAL-MELTING FURNACE

[75] Inventor: Larry D. Areaux, Punta Gorda, Fla.

[73] Assignee: Premelt Pump, Inc., Kalamazoo, Mich.

[21] Appl. No.: 09/058,495

[22] Filed: Apr. 10, 1998

[51] Int. Cl.[6] .............................. C22B 9/16; C22B 9/187
[52] U.S. Cl. ................. 75/583; 75/594; 75/612; 75/638; 75/686; 75/687; 266/233; 266/900; 266/901
[58] Field of Search .............................. 75/583, 594, 612, 75/638, 686, 687; 266/233, 900, 901

[56] References Cited

U.S. PATENT DOCUMENTS

| 4,572,485 | 2/1986 | Engelberg et al. | 266/233 |
| 5,863,314 | 1/1999 | Morando | 75/708 |

*Primary Examiner*—Melvyn Andrews
*Attorney, Agent, or Firm*—The Firm of Gordon W. Hueschen

[57] ABSTRACT

The charge well of a metal melting furnace is provided with an internal cavity having a circular cross section when viewed from the top, preferably a cavity of cylindrical or conical configuration, and with a peripheral exit port located tangentially with respect to said cavity at a lower level thereof for exit of molten metal into the main chamber of the furnace. An inert gas bubble-actuated molten metal pump brings molten metal from a hotter section of the furnace, advantageously directly from the main chamber, and has its exit port located tangentially to the periphery of the cavity at an upper level thereof, thereby creating vortical flow of molten metal within the charge well for the more rapid and efficient melting of metal chips and scraps into the molten metal therein and for circulation of hotter molten metal throughout the furnace. A head of molten metal can be created in the charge well, which advantageously has an exit port of restricted internal cross-sectional area, to assist with attainment of these objectives. A heat and flame-resistant cover may be located above the cavity and advantageously has an aperture therein for the loading of metal chips or scrap thereinto. A gravity-feed chip charger may surmount the aperture for the discharge of new metal chips or scrap into the cavity through the said aperture.

42 Claims, 4 Drawing Sheets

APPARATUS HAVING GAS-ACTUATED PUMP AND CHARGE WELL AND METHOD OF MELTING METAL THEREWITH CHARGE A WELL OF A METAL-MELTING FURNACE

BACKGROUND OF THE INVENTION

1. Field of the Invention

Metal melting in a metal-melting furnace, and particularly the use of an inert gas bubble-actuated molten metal pump in a metal-melting furnace in a particularly arranged combination with a charge well of the furnace having a unique interior configuration to create a vortex therein, and advantageously additional associated apparatus, to bring metal yields and melt rates to new heights. Creation of a head of molten metal in the charge well to increase the velocity at which molten metal is discharged from the charge well into the main chamber.

2. Prior Art

The state of the art regarding the introduction of metal chips into the charge well of a metal melting furnace and the conveyance of molten metal from one place to another within or out of a metal melting furnace has been fully reviewed in my prior U.S. patents, namely, U.S. Pat. Nos. 4,702,768, 4,710,126, 4,721,457, 4,872,907, 5,211,744, 5,203,910, 5,403,381, 5,468,280 and 5,407,462, the disclosures of which patents are incorporated herein by reference.

In particular, the employment of an inert gas bubble-actuated molten metal pump for moving molten metal from one place to another in a metal-melting furnace or out of a metal melting furnace has been disclosed in my prior U.S. Pat. No. 5,203,910 as well as in my U.S. Pat. Nos. 5,403,381 and 5,468,280. A heat- and flame-resistant cover for at least a substantial portion of a charge well has been disclosed in my U.S. Pat. No. 5,211,744. Various methods and charger means for introducing metal chips into the charge well of a metal-melting furnace have been disclosed in my prior U.S. patents, in particular a stripforming briquetter device and method in my prior U.S. Pat. No. 4,702,768, a compacting extruder method and means in my prior U.S. Pat. No. 4,872,907, and a mass flow gravity feed method and apparatus for charging metal chips into the charge well of a metal-melting furnace in my prior U.S. Pat. No. 5,407,462 as well as an improved version thereof as disclosed in my published PCT application PCT/US97/15138, published as WO98/08985 on Mar. 5, 1998.

Although the inventions of these prior patents have gone far in advancing the state of the art, including the conveyance of molten metal from one place to another in a metal melting furnace or out of the metal-melting furnace, an improvement in total efficiency is always a highly-desirable objective and one which is fulfilled admirably by the provision of the present invention whereby certain of the salient features of my prior inventions and patents are combined with a novel and unique type of charge well in a manner which overcomes previous shortcomings, and greatly improves the rate of melt of new chips or scraps especially lighter grades of scrap such as turnings and small chips, into the metal pool in the charge well, the unique combination of the various aspects and elements of the invention increasing greatly the efficiency of the operation by an astute combination of the pump, the unique inner-cavity charge well, the arrangement of the pump with respect to the inner cavity of the charge well, and advantageously also the heat- and flame-resistant cover and chip charger-preferably of the gravity feed type, all together contributing to elevate the efficiency and economy of the operation to new and previously unattainable heights as further discussed hereinafter. The creation of a head of molten metal in the charge well, as compared to the level of molten metal in the main chamber, is also desirable to increase overall efficiency, and an exit port from the charge well to the main chamber of restricted internal cross-sectional area can be advantageously employed to assist with this result.

Vortexes have been created in the metal-melting industry using mechanical stirring impellers, conventional centrifugal molten metal pumps, and in some cases an electromagnetic pump. Such vortex systems as available on the market enjoy a satisfactory reputation for high volume scrap melting and create minimal difficulties and problems, but fall far short of attaining optimum melt yields. The melt yields, using existing vortex systems, particularly when melting lighter grades of scrap such as turnings and fine chips, do not achieve a satisfactory level. This is to be expected when, as is the case with such existing systems, the molten metal both enters and leaves the charge well at approximately the same level, just above the bottom of the well. It is also to be expected when one considers the number of pounds of molten metal exposed to atmosphere over a given period of time when melting in a charge well without a cover and without any inert gas acting as an antioxidant medium positioned beneath such cover atop the molten metal in the well. Published melt yield levels when melting aluminum chips by one manufacturer who employs the vortex method is approximately 90%.

According to the present invention, using the unique vortex method of submergence created using the inert gas bubble-actuated molten metal pump, especially in combination with a heat- and flame-resistant cover over the charge well or over at least a substantial portion of the cavity thereof, and especially when employing a gravity-feed metal chip charger as set forth in the foregoing and hereinafter, the melt rate can be substantially increased and the metal yield can be increased to approximately 95–97%. The invention of the present application combines the novel submerged melt vortex procedure and apparatus, advantageously with cover and furnace charger, not only for submerged melting of metal chips and scraps into the molten metal pool, but also provides stirring and circulation of molten metal throughout the furnace, especially when head pressure is established or created in the charge well by providing a greater height of molten metal in the charge well than in the main chamber, which is advantageously assisted by restricting the internal cross-sectional area of the exit port from the charge well, at or near the bottom thereof, into the main chamber, e.g., so that the internal cross-sectional area of this opening or exit port is between about 1 and 20, preferably 2 and 10, times the internal cross-sectional area of the conveying conduit or conduits which bring the molten metal to the internal cavity of the charge well at or near the top thereof. The present system can be used efficiently for lighter grades of scrap such as chips and fine turnings but, with the furnace charger elevated out of position over the charge well, allows the versatility of charging all varieties of heavy grade metal scrap directly into the charge well vortex for rapid submergence thereof without the employment of a superposed metal chip or scrap furnace charger and, if desired, without the cover.

Thus, the present invention in both method and apparatus aspects, will involve the charge well having a unique interior configuration and the associated inert gas bubble-actuated molten metal pump, bringing hotter molten metal into the interior cavity of the charge well and creating the said vortex for the rapid and efficient melting of metal chips and scraps into the molten metal mass therein. The creation of the said head of molten metal in the charge well and the head pressure which it exerts assists greatly in the melting efficiency of the vortex and in the circulation of higher-temperature molten metal throughout the system.

It may also advantageously involve the employment of a heat- and flame-resistant cover over at least a portion of the surface of the molten metal contained in the interior cavity of the charge well and, with an aperture provided in the said cover, the charge well may be surmounted by a metal scrap and chip charger, preferably of the gravity feed type, for the feeding of metal scrap and chips into the interior of the cavity through the said aperture. On the other hand, with the furnace charger out of position superposed above the charge well, all varieties of aluminum or other metal scrap may be charged directly into the vortex of the inner cavity of the charge well, either through the aperture in the cover or absent the cover. When the cover is in place, the inert gas used to actuate the molten metal pump collects beneath the cover and assists greatly in preventing oxidation of the molten metal in the inner cavity of the charge well, as we have now well established in the art.

THE PRESENT INVENTION

The charge well of a metal melting furnace is provided with an internal cavity having a circular cross section when viewed from the top, preferably a cylindrical or conical configuration, and with a peripheral exit port, preferably of reduced or limited area, located tangentially with respect to said cavity at a lower level thereof for exit of molten metal into the main chamber of the furnace. the main chamber. An inert gas bubble-actuated molten metal pump brings molten metal from a hotter section of the furnace, advantageously directly from the main chamber where the molten metal is its hottest, and has its exit port located tangentially to the periphery of the cavity at an upper level thereof, thereby creating vortical flow of molten metal within the charge well for the more rapid and efficient melting of metal chips and scraps into the molten metal therein, advantageously assisted if desired by the head pressure developed by creating a head of molten metal in the charge well. A heat and flame-resistant cover is advantageously located above the cavity and most advantageously has an aperture therein for the loading of metal chips or scrap thereinto. A gravity-feed chip charger advantageously surmounts the aperture for the discharge of new metal chips or scrap into the cavity through the said aperture. The use of the inert gas bubble-actuated molten metal pump to create vortical movement in a charge well of a metal-melting furnace, and its combination with additional elements for even greater efficiency, are all accordingly a part of the present invention.

OBJECTS OF THE INVENTION

It is an object of the present invention to provide an improved vortical-flow method for the rapid and efficient melting of metal chips and scraps into the molten metal in the charge well of a metal-melting furnace. Another object of the invention is to provide a charge well having a unique internal configuration especially adapted for the creation of a vortex of molten metal therein. A further object is to provide a combination of such a charge well having the uniquely-configured internal cavity and an inert gas bubble actuated molten metal pump for bringing hotter molten metal from another section of the metal-melting furnace, especially directly from the main chamber, into the charge well, and having its exit port tangentially arranged with respect to the periphery of the internal cavity of the charge well for the creation of a vortical flow of molten metal within the internal cavity of the charge well. Still a further object is to improve the efficiency of the method and the vortex involved therein by the creation of a head of molten metal in the charge well and its resulting head pressure. An additional object of the invention is to provide a heat- and flame-resistant cover over at least a substantial portion of the internal cavity of the charge well for the capture of inert gas therebeneath for the protection of the molten metal in the charge well against oxidation. Still an additional object of the invention is to provide said cover with an aperture for the introduction of metal chips or scrap into the internal cavity of the charge well and advantageously to provide metal chip charging means, preferably in the form of gravity feed chip charging means, for the introduction of metal chips and scrap into the internal cavity of the charge well, advantageously but not exclusively through such an aperture provided in such a cover. Still other objects of the invention will become apparent hereinafter, and yet other objects will be obvious to one skilled in the art to which this invention pertains. All of these objects of the invention are in fact attained by provision of the method and the specific combination and arrangement of the various apparatus items of the present invention.

SUMMARY OF THE INVENTION

What I believe to be my invention, then, inter alia, comprises the following, singly or in combination:

In a metal-melting furnace having a main chamber and a charge well, the combination of a charge well comprising an internal cavity having a substantially circular cross section when viewed from the top, an inert gas bubble-actuated molten metal pump having its entry port outside of said charge well in another area or section of said metal-melting furnace and its exit port tangentially arranged with respect to the periphery of said cavity at or near the top of the charge well, said charge well having an exit port or outlet for molten metal into the main chamber of said metal-melting furnace tangentially arranged with respect to the periphery of said cavity at or near the bottom of said charge well; such a combination wherein said cavity has the configuration of a substantially vertically-oriented cylinder; such a combination wherein said cavity is of decreasing circumference so as to be of the nature of a cone with a downward apex; such a combination wherein said cone has stepped sidewalls; such a combination comprising heat-and flame-resistant cover means over said internal cavity; such a combination wherein said cover means is adapted to fit into said cavity and to substantially cover the surface of the molten metal when contained in said cavity; such a combination wherein said cover means comprises an aperture for the feeding of metal chips or scrap therethrough and into the cavity of said charge well; such a combination comprising a chip charger in association with said aperture for the feeding of metal chips and scrap into said cavity through said aperture; such a combination wherein said chip charger is a gravity-feed metal chip charger; such a combination wherein said chip charger comprises a vertically-oriented conduit for forming a substantially vertically oriented column of metal chips or scrap within and above said aperture and is adapted to discharge metal chips or scrap from said column through said aperture and into said cavity; such a combination wherein the pump comprises an elongated conveying conduit having a lower end and an upper end, at least a portion of said conduit being inclined upward from the horizontal; such a combination wherein said conveying conduit has an inert gas and molten metal inlet at or adjacent its lower end and an inert gas and molten metal outlet at its upper end; such a combination wherein said pump is set in a wall between the charge well and an adjacent well of said metal-melting furnace; such a combination wherein said pump is set in an opening in said wall with its lower end in said adjacent well and its upper end at or in said charge well; such a combination wherein said elongated conveying conduit is angled with an upper portion substantially horizontal and a lower portion extending downwardly at an angle to the horizontal; such a combination wherein said conveying conduit is molded in or routed out of a block of molten metal- and high temperature-resistant refractory material; such a combination wherein the refractory material is a graphite, ceramic, silica, or silicon carbide material; such a combination wherein the entry port of said inert gas bubble-actuated molten metal pump is located so as to draw molten metal, when present in the main chamber of the metal-melting furnace, directly from said main chamber; such a combination wherein the exit port of said charge well has a restricted internal cross-sectional area; and such a combination wherein the exit port of said charge well into the main chamber of the metal-melting furnace has an internal cross-sectional area 1 to 20, preferably 2 to 10, times the internal cross-sectional area of the pump conduit or conduits.

Moreover, a method for the rapid and efficient melting of metal chips or scrap in a metal melting furnace having a main chamber and a charge well, comprising the following steps:

providing a charge well comprising an internal cavity having a substantially circular cross section when viewed from above, and providing an exit port for exit of molten metal out of said charge well and into the main chamber of said metal melting furnace tangentially-oriented with respect to the periphery of said cavity at a lower level of said charge well, providing an inert gas bubble-actuated molten metal pump having its lower end located outside of said charge well in another area or section of said metal-melting furnace for entrance of hotter molten metal thereinto from a hotter area or section of said metal-melting furnace and its exit port for exit of molten metal therefrom oriented tangentially to the periphery of said cavity at an upper level of said charge well, causing molten metal to enter said inert gas-actuated molten metal pump and then to enter said cavity tangentially at an upper level of said charge well and causing molten metal from said cavity to exit said cavity tangentially at said lower level of said charge well, thereby creating a vortex of molten metal within the cavity of said charge well, and providing metal chips or scraps to said charge well; such a method wherein said cavity is in the form of a substantially vertically-oriented cylinder; such a method wherein said cavity is in the form of a cone having a decreasing circumference and a downward apex; such a method wherein said cone has stepped sidewalls; such a method wherein metal chips or scraps are introduced into said cavity and enter into said vortex for rapid and efficient melting into the molten metal therein; such a method including the step of providing heat and flame-resistant cover means for said charge well to retain inert gas therebelow; such a method including the step of providing an aperture in said cover means and introducing metal chips or scrap into said cavity through said aperture; such a method including the step of providing metal chip-charger means for introducing metal chips or scraps into said cavity and introducing said metal chips or scraps thereinto; such a method wherein said introduction is effected using gravity feed metal chip charger means; such a method wherein the pump comprises an elongated conveying conduit having a lower end and an upper end, at least a portion of said conduit being inclined upward from the horizontal; such a method wherein flow of molten metal in said conveying conduit is effected by means of inert gas introduced into said conveying conduit at or adjacent its lower end and rising up the incline therein to emerge at its upper end; such a method wherein said pump is set in a wall between the charge well and an adjacent well in said metal-melting furnace; such a method wherein said pump is set in an opening in said wall with its lower end submerged in molten metal in said adjacent well and its upper end in said charge well; such a method wherein said elongated conveying conduit is angled with an upper portion substantially horizontal and a lower portion extending downwardly at an angle to the horizontal; such a method wherein the molten metal and the metal chips charged into the charge well comprise aluminum, magnesium, titanium, brass, iron, or steel, or an alloy thereof, or a metal for alloying one of said metals; such a method wherein the charge of metal chips or scraps is provided by means of a mass flow gravity feed metal chip charger; such a method wherein the entry port of said inert gas bubble-actuated molten metal pump is located so as to draw molten metal directly from said main chamber; such a method including the step of creating a head of molten metal in the charge well to assist vortical movement of molten metal therein and circulation of high temperature molten metal throughout the metal-melting furnace; such a method wherein the exit port of said charge well has a restricted internal cross-sectional area and, finally, such a method wherein the internal area of said exit port of said charge well into the main chamber of the metal-melting furnace has an internal cross-sectional area 1 to 20, preferably 2 to 10, times the internal cross-sectional area of the pump conduit or conduits.

DESCRIPTION OF THE DRAWINGS

Reference is now made to the drawings, wherein.

DETAILED DESCRIPTION OF THE INVENTION

Figure 1:
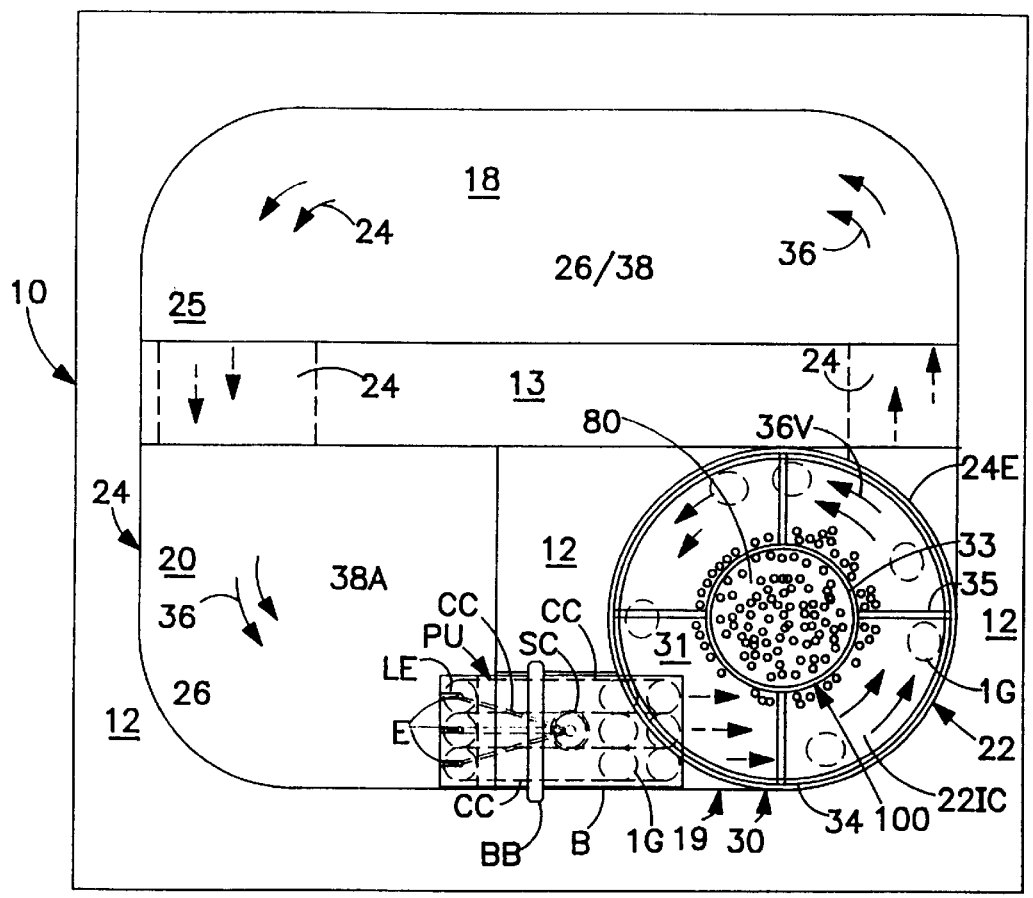
FIG. 1 is a top plan view of a metal-melting furnace, in this case a reverberatory furnace, partially schematic and partially in section, taken along line I—I of FIG. 2, with superstructure removed to show the apparatus required according to the invention and illustrating the method of the invention, including especially the various chambers or wells of the metal-melting furnace, a cover over a substantial portion of the charge well thereof, and an inert gas bubble-actuated molten metal pump between a well of the furnace other than the charge well, here an adjacent well, and the charge well itself.

The present invention, in both its method and apparatus aspects, will be more readily understood from the following detailed description, particularly when taken in conjunction with the drawings, in which all of the significant parts are numbered or lettered and wherein the same numbers and letters are used to identify the same parts throughout.

A metal-melting furnace, as shown a reverberatory furnace, of refractory material or having the usual refractory lining and fired by combustion burners fed by natural gas or fuel oil which throw flames into the interior of main chamber 18 thereof through usual flame-introduction means, is shown in the FIGS. at 10.

The furnace well comprises bottom wall 11 and side or vertical walls 12 and 13, with a mass of molten metal, preferably and usually aluminum or magnesium or an aluminum or magnesium alloy, therein being shown at 26. The base portions 11 of the furnace may be supported on the underlying floor by means of I-beam supports 15, as shown. Main chamber 18 is provided with main chamber extensions 19 in the form of intermediate and adjacent well 20, which is usually referred to as the circulation well, and the charge well 22, which has an internal cavity with circular cross-section when viewed from above, and which are connected with main chamber 18 by means of communicating passageways 24. Passageway or exit port 24E leading from charge well 22 into main chamber 18 is oriented tangentially to the periphery of inner cylindrical cavity 22IC of charge well 22. Molten metal 26 is contained in main chamber 18 and is circulated from the hottest part thereof, indicated at 38, into intermediate well 20 via communicating passageway 24 and thence into charge well 22 and the vertically cylindrical internal cavity thereof 22IC via pump PU. The necessary circulation is provided by means of inert gas bubble-actuated molten metal pump PU, located in an opening in wall 12 between intermediate and adjacent well 20 and charge well 22. Separate circulating means in what is normally circulation well 20 is not required. Conveying conduit CC is molded in or routed out of a block of refractory material B, which is resistant to the molten metal 26 and the high temperatures employed, the refractory material usually being of a graphite, ceramic, silica, or silicon carbide material. Elongated conveying conduit CC of pump PU is angled with an upper portion substantially horizontal and a lower portion extending downwardly at an angle to the horizontal, the lower end thereof being designated LE and the upper end or exit port thereof being designated UE. Different versions of the pump PU may have a lower curved or horizontal CC segment and an upper curved or horizontal CC segment and the angle may be varied from a slight acute angle to 90 degrees. The form of pump PU and the angle of conduit(s) CC shown in the drawings are considered to be of nearly maximal efficiency.

Also visible in the drawings is the molten metal oxide or dross 25, which ordinarily collects at the surface of the molten metal pool or bath or mass 26, this being shown as present in all of the wells of the metal-melting furnace 10 except charge well 22. According to the flow path or pattern 36 in such a metal-melting furnace 10, as created by the action of the inert gas bubble-actuated molten metal pump PU and the conveying conduit CC thereof, circulation of molten metal 26 in furnace main chamber 18 is constantly and continuously moved from the hottest point 38 in main chamber 18, through communicating passageway 24 into intermediate and adjacent well 20, and thence by means of pump PU and conveying conduit CC into charge well 22. Due to its proximity to the hottest point in main chamber 18, the molten metal 26 in intermediate and adjacent well 20 is hotter, for example at point 38A, than the molten metal in charge well 22 in which coldest point 40 of the molten metal in the entire metal-melting furnace is usually located. Barrier block BB is provided to prevent backflow of molten metal from the charge well 22 to the intermediate well 20, which is of significance especially when a head H of molten metal is created in the charge well 22.

As shown, this coldest point 40 is at a point or at a point closely adjacent to the normal point of introduction of a charge of new or used unmelted chips 80 into charge well 22, as by a chip-charging means 100 of any suitable type, and the necessity of bringing hotter molten metal to this relatively cold charge well 22 by maintaining adequate circulation throughout the metal-melting furnace 10 and in all chambers thereof is well understood by one skilled in the art.

As shown, the chip-charging means 100 comprises a vertically disposed metal chip charging conduit 51 which is an integral part of mass flow gravity feed metal chip charger 50. Internal of the vertically disposed metal chip charging conduit 51 is located a new charge of metal chips 80, as fully disclosed in my earlier U.S. Pat. No. 5,407,462, which gravity feed charger 50 is disposed above an aperture 33 in flame-resistant and temperature-resistant cover 30, comprising an upper metal surface 31 which is provided with metal edging 34, angle iron supports (not shown), and flanges 35, and which advantageously has refractory material 32 secured to the flat steel plate 31 or clad thereto, or otherwise constituted as such a charge-well cover is described in my previous U.S. Pat. No. 5,211,744. Charge-well cover 30 preferably covers the entire upper surface of charge-well internal cavity 22IC and the mass of molten metal 26 therein and in any event covers as much of the surface of charge-well cavity 22IC and the mass of molten metal 26 therein as is possible and convenient, and in all cases is adapted to cover a substantial portion of the surface of charge well cavity 22IC and the mass of molten metal 26 therein.

In one preferred embodiment, the cover 30 is a self-leveling floating cover which floats upon the surface of the molten metal mass 26 and, in such case, the weight of the cover is simply reduced to a point where the density of the cover 30 is sufficiently lower than that of the molten metal mass 26 so as to permit the cover 30 to float on top of the molten metal mass. Such objective is readily attained by employing more of refractory material 32 and less heavy material such as flat steel plate 31 so as to attain the desired relation of density of the cover 30 to the density of the molten metal mass 26 and, if desired, in at least some cases cover 30 may comprise only refractory material 32 since refractory board of improved stability and increased heat- and flame-resistance is now commercially available. If desired, the cover 30 may be lifted into and out of its position atop molten metal mass 26 by means of a chain-type mechanism and hoist, such as CH and HO, so as to permit ready cleaning of the underside of cover 30 and, in case the cover 30 is a floating cover, it simply floats up and down on top of the molten metal bath 26 regardless of the metal level in the furnace chamber. As a further preferred embodiment to facilitate attainment of the objectives of the present invention, the cover 30 may also be notched, if desired, so as to straddle the exit port UE of the pump PU and its conveying conduit CC so as to permit more efficient capture of the inert gas IG emerging from the said exit port UE of the pump PU.

The substantially vertical or in any case vertically disposed metal chip charging cylindrical conduit 51 of mass flow gravity feed charger 50 is as usual associated with and possibly connected to cover 30 for lifting out of position atop molten metal mass together with charger 50, and the bottom of the interior thereof communicates with central aperture 33 of cover 30, thereby allowing metal chips 80 to fall by the force of gravity (or with assistance by shaking down in an embodiment in which the conduit 51 is moveable vertically upwardly and downwardly) through central aperture 33 in cover 30 into the molten metal mass 26 in charge well 22. Although less advantageously, any other chip-charging means for introducing metal chips into the charge well of a metal-melting furnace may be employed instead of the mass flow gravity feed charger 50 shown in the drawings, ordinarily in conjunction with a cover 30 and usually involving a suitable aperture or opening in cover 30 but not necessarily a central aperture such as central aperture 33 shown in the drawings in association with the mass flow gravity feed charger 50, such as the chip charger means of my prior U.S. Pat. Nos. 4,702,768, 4,872,907, or of course any variation of the mass flow gravity feed charger of my prior U.S. Pat. No. 5,407,462 or any improvement thereof, the exact chip-charging means employed not being of the foremost essence of the present invention, although a gravity feed charger 50 such as shown in the drawings and as further disclosed in detail in my prior U.S. Pat. No. 5,407,462 or WO 98/08985 is greatly preferred. In any event, fresh metal chips, whether new or used, are intro duced into the molten metal mass 26 in charge well 22.

Returning to the inert gas bubble-actuated molten metal pump PU, as is usual the flow of molten metal 26 in the pump PU is effected by means of bubbles of inert gas IG introduced into the conveying conduit CC at or adjacent its lower end LE and rising up the incline therein to emerge at its upper end or exit port UE, at which point the hotter molten metal 26 and the inert gas IG, together referred to as effluent 26/IG, in effect "shoot out" tangentially into the molten metal 26 in charge well 22, the outlet or upper end UE of the conveying conduit CC, and thus of the pump PU, being directed tangentially toward an area of the inner cavity 22IC of charge well 22 and the mass of molten metal 26 therein into which metal chips 80 are introduced by the chip charger 100, in this case by mass flow gravity feed charger 50. The entrance of the hotter molten metal 26 into the colder molten metal mass 26 of the charge well 22, inasmuch as it is directed toward the area of the molten metal mass 26 in charge well 22 into which the new charge of chips 80 is being introduced, raises the temperature in that area considerably and greatly assists with the melting of the new charge of chips 80 into the molten metal mass 26. In addition thereto, when the hotter molten metal 26 impinges upon or comes into contact with the new charge of metal chips 80, the melting process is greatly facilitated. Further, as the bubbles of inert gas IG emerge from the upper end or exit port UE of the conveying conduit CC of pump PU and into the mass of molten metal 26 in charge well 22, the bubbles of inert gas IG are released and rise upwardly but, instead of escaping, at least a substantial portion of the inert gas IG is captured in charge well 22 beneath cover 30, when present, and there provides a non-oxidizing atmosphere in the form of bubbles and a layer of inert gas IG at the surface of the said molten metal 26 in the charge well 22 and beneath the cover 30. Thus, the same inert gas IG used for actuation of the molten metal pump PU is used to provide a non-oxidizing atmosphere beneath the cover 30 in charge well 22.

Figure 4:
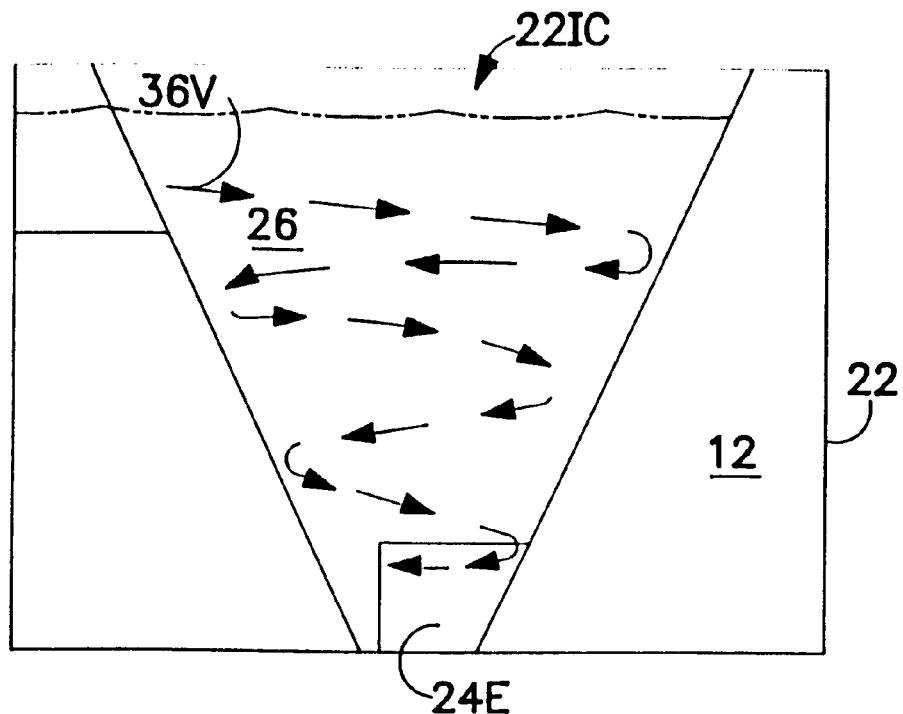
FIG. 4 is a schematic front elevational view of the charge well and its internal cavity, shown in FIG. 2 as being of the nature of a substantially vertically-oriented cylinder, in this case being conical in shape with its vortex oriented toward the bottom.
Figure 5:
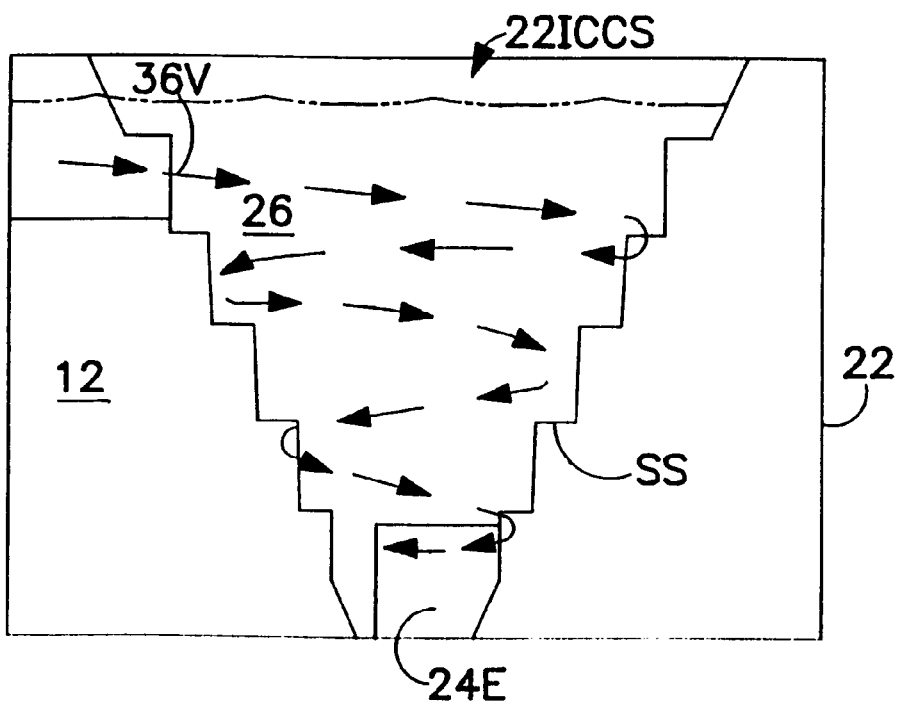
FIG. 5 is the same as FIG. 6, in this case the internal cavity having stepped side walls.

However, in the case of the present invention, the internal cavity 22IC of charge well 22 has a substantially circular cross section when viewed from the top, and is generally of the nature of a vertically-oriented cylinder, or a cone having decreasing dimensions and a downwardly-located apex 22ICC, which may or may not have stepped side walls SS as in cavity 22ICCS, as alternatively shown in FIGS. 4 and 5, and in any event the upper end or exit port UE of the conveying conduit CC of inert gas bubble-actuated pump PU is directed tangentially at the periphery of internal cavity 22IC at an upper level thereof, which in turn has its exit port 24E into the main chamber of the furnace located tangentially with respect to the periphery of internal cavity 22IC at a lower level thereof, so that the combination of the inert gas bubble-driven molten metal into internal cavity 22IC from upper end or exit port UE of inert gas bubble-actuated molten metal pump PU, the effluent combination of hotter molten metal 26 and the inert gas IG together being referred to as effluent 26/IG, not only "shoots out" into the molten metal 26 in charge well 22, but within the internal cavity 22IC thereof create a vortex commencing from the top level of the molten metal 26 at its entry level into internal cavity 22IC and terminating at the bottom of the internal cavity 22IC at its exit port 24E into the main chamber 18 of the metal-melting furnace, thus in effect "sucking down" even the lightest turnings or chips into the maelstrom of hotter molten metal and rapidly and efficiently converting these solid materials into the melt or pool of molten metal within the metal-melting furnace.

The lower end of the inert gas supply or feed line in the form of pipe P may be or may not be split, e.g., bifurcated or trifurcated (as shown), so as to provide a plurality of exit ports E for the inert gas, thereby providing a plurality of streams of inert gas bubbles IG within a single or multiple conveying conduit CC for better actuation of the molten metal pump PU, if desired, or a similar result can be attained by use of a plurality of pipes P, or by the use of a multiple gas manifold, which latter is usually employed with a plurality of conveying conduits CC, all as illustrated in my U.S. Pat. No. 5,203,910. As shown in the drawings, there are three side-by-side conveying conduits CC, each with its own entry port for inert gas from the plurality of exit ports E stemming from feed line pipe P, although of course the material between the three conduits CC could obviously be routed out to provide a single larger conduit CC, in which case a single flattened and horizontally-elongated entry port for the entry of inert gas IG thereinto may also be advantageously employed.

As shown in the drawings, the gas feed means comprises inlet port I and pipe P, having an exit port E at its lower end, which communicates with the lower end LE of the conveying conduit CC of pump PU, the pipe P being encased in a supporting column SC and the supporting block B of refractory material also being attached to supporting column SC, the connections between support column SC and block B being immaterial so long as they are durable, as by suitable molten-metal and heat-resistant clamps or welds, by press fitting, by welding to metal inserts, or the like. Since the connecting means are immaterial, they are not shown in the drawings. The support column SC is supported from hanger H, which is in turn supported by chain or cable CH connections to a ring or hook, in turn suitably connected to a hoist HO, not shown, for rapid and convenient introduction into and removal of the pump PU and its auxiliary fittings, supports, and inert gas feed line as a unit from their operative location between wells of the metal-melting furnace.

From FIGS. 4 and 5 will be seen alternative embodiments of the invention wherein the charge well 22 has a different configuration than in earlier figures, where charge well 22 had an internal cavity 22IC of a circular cross section when viewed from above and is in the form of an essentially vertically-arranged cylinder. In FIG. 4 the internal cavity 22ICC of charge well 22 is in the form of a cone having a decreasing circumference and a downward apex and, from FIG. 5, it will be seen that a further alternative form of the internal cavity 22ICCS of charge well 22 is a cone having a decreasing circumference and a downward apex wherein the cone has stepped side walls SS. The arrangement of these internal cavities in these alternative forms thereof is the same as for the cylindrical cavity 22IC in FIG. 2, with the exit port or upper end UE of the inert gas bubble-actuated molten metal pump PU being tangentially arranged with respect to the periphery of said cavity at or near the top of the charge well, i.e., at an upper level thereof, and the outlet 24E for molten metal from the charge well into another section of the metal-melting furnace being tangentially arranged with respect to the periphery of the internal cavity at or near the bottom of said charge well, i.e., at a lower level thereof.

Figure 6:
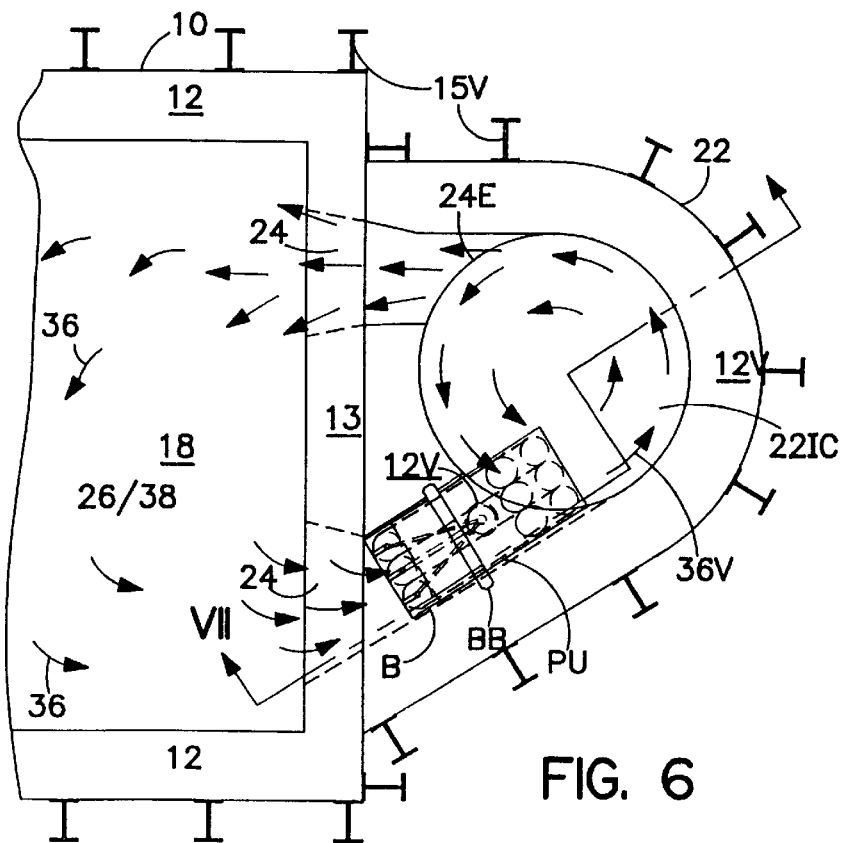
FIG. 6 is a top plan view of a superior and streamlined embodiment of the invention wherein the charge well is located adjacent the main chamber and hotter molten metal is drawn directly from the main chamber by the pump, used to produce the vortex, and discharged back into the main chamber with new feed melted thereinto, any chip charger and any heat- and flame-resistant cover having been moved out of position surmounting the charge well.
Figure 7:
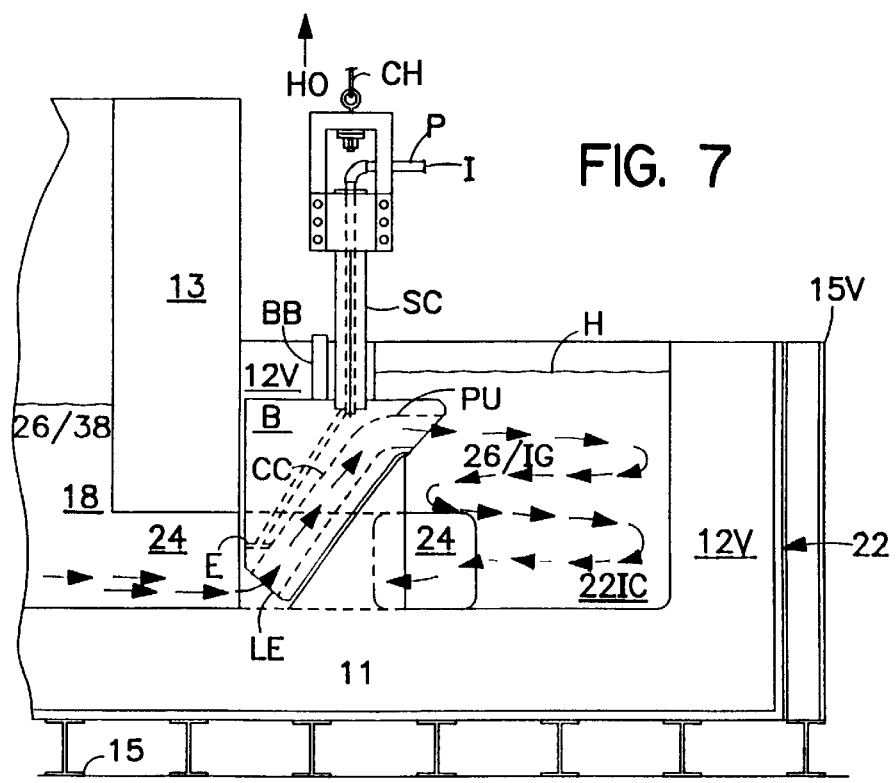
FIG. 7 is a side elevational view of the apparatus of FIG. 6 taken along line VII—VII of FIG. 6 showing a head of molten metal created in the cyclindrical inner cavity of the charge well as well as a restricted area exit port from the bottom of charge well into the main chamber to assist with creation of said head.

FIGS. 6 and 7 illustrate a superior and streamlined embodiment of the invention, in which there is no intermediate or circulation well 20 but in which the charge well 22 is located adjacent the main chamber 18 and hotter molten metal 26 is drawn directly by means of the pump PU and communicating passageway 24 in wall 13 from the hottest part 38 of main chamber 18, used to produce the vortex in the internal chamber 22IC of charge well 22 into which metal chips or scraps are introduced, and then thrust outwardly from a lower level of internal cavity 22IC via restricted opening 24E tangentially arranged with respect to said inner cavity 22IC back into main chamber 18 via communicating passageway 24 in wall 13, the pump PU and the charge well 22 being located in an area adjacent wall 13 of main chamber 18 made a part of the structure of furnace 10 by surrounding wall 12V, all vertical walls 12, 12V, and 13 being held in place with the assistance of vertical I bars 15V and bottom wall 11 being supported on the usual I-beam supports 15.

Figure 2:
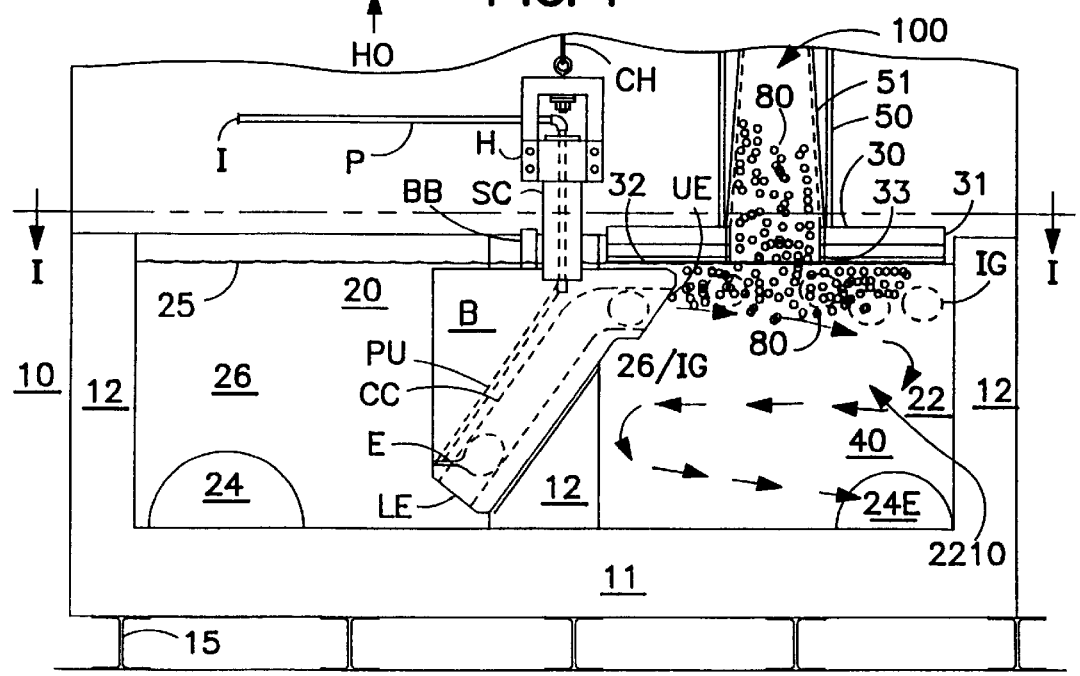
FIG. 2 is a front elevational view, partially schematic and partially in section, showing apparatus required according to the invention and illustrating the method of the invention in association with the vertically cylindrical inner cavity charge well of the reverberatory furnace, a mass flow gravity feed metal chip charger and a charge-well cover being clear from this Figure, as well as an intermediate adjacent well and the inert gas bubble-actuated molten metal pump therebetween with its exit port upwardly and tangentially located with respect to the periphery of the inner cylindrical cavity of the charge well.
Figure 3:
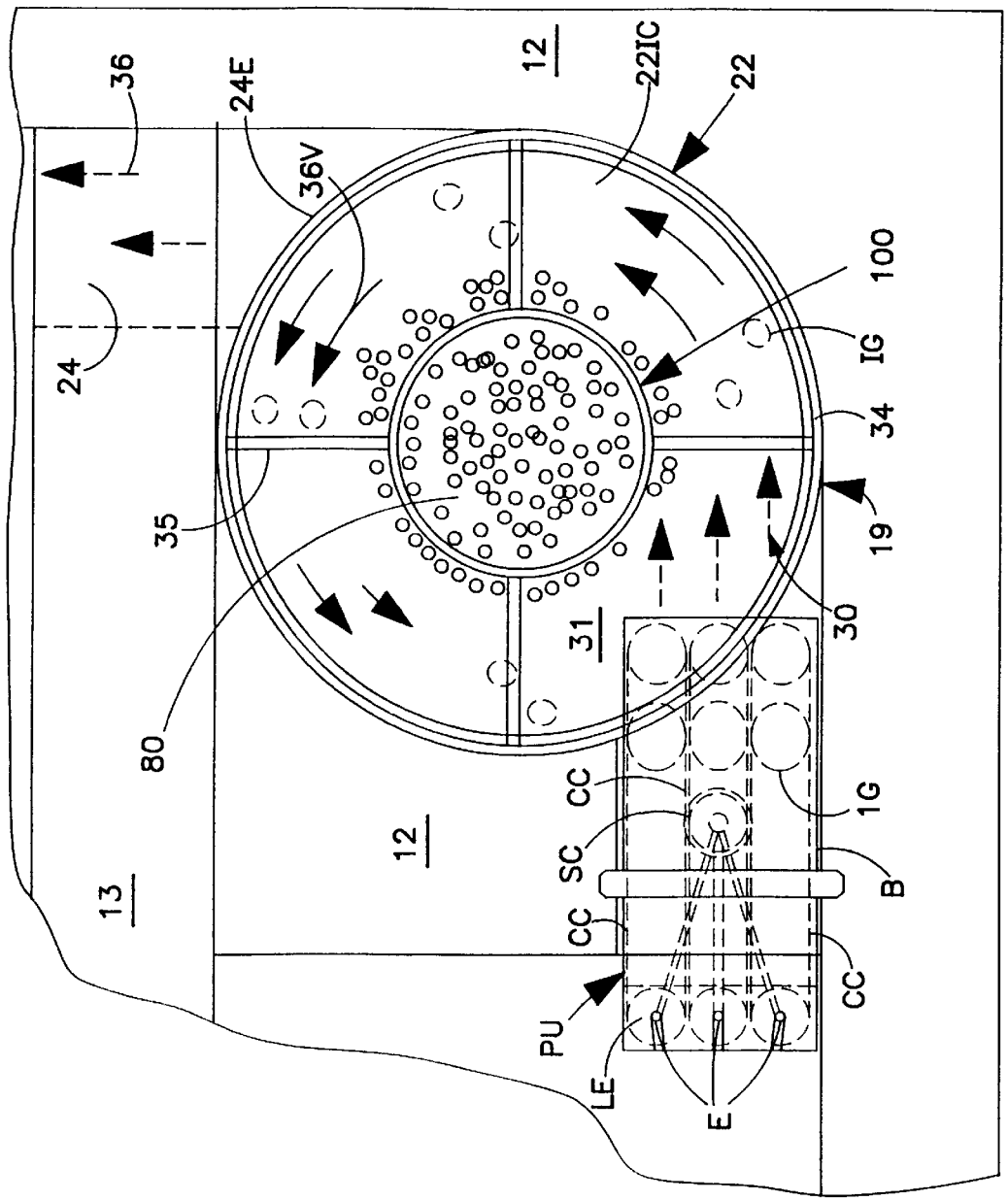
FIG. 3 is an enlarged view of a portion of FIG. 1, showing in greater detail the inert gas bubble-actuated molten metal pump, its location in a wall between the adjacent well and the charge well, and the charge well internal cavity which is essentially circular in cross-section when viewed from the top, indicating the direction of the vortical motion of the molten metal within the internal cavity, and showing the upper end or exit port of the inert gas bubble-actuated molten metal pump tangentially oriented with respect to the periphery of the circular inner cavity, the inert gas bubbles IG and directional arrows 36V being shown in shadow lines.

As shown in the side elevation of FIG. 7 the pump PU, which is identical to the pump shown and described for FIGS. 1, 2, and 3, is mounted at an angle and brings hotter molten metal 26 from main chamber 18 via communicating passageway 24 in wall 13 and ejects the hotter molten metal 26 along with the inert gas IG propelling the same tangentially around the periphery of the internal cavity 22IC of cylindrical charge well 22. As shown in FIG. 7, a head H of molten metal 26 is built up in internal cavity 22IC for improved efficiency as previously described, and the buildup of this head H may be assisted by providing a restricted exit port 24E from the vortex and internal chamber 22IC at or near the bottom thereof identified in FIGS. 6 and 7 as 24E. Barrier block BB is provided to prevent backflow of molten metal from the charge well 22 to the adjacent area of the furnace, which is of significance especially when a head H of molten metal is created in the charge well 22.

As previously stated, exit port 24E for this purpose is advantageously restricted as to its internal cross-sectional area where it exists in charge well 22 at or near the bottom thereof for connection of charge well 22 with main chamber 18, and the internal cross-sectional area of this opening or exit port 24E is therefore advantageously dimensioned so as to be between about 1 and 20, preferably 2 and 10, times the internal cross-sectional area of the conveying conduit or conduits CC which bring(s) the molten metal 26 to the internal cavity 22IC of the charge well 22 at or near the top thereof.

OPERATION

In operation, molten metal from the main chamber 18 of the metal-melting furnace 10 is circulated, with the assistance of inert gas bubble-actuated molten metal pump PU, which may be located between what is usually the "circulation" well 20 of the metal-melting furnace and the charge well 22 of the metal-melting furnace, but which is preferably located so as to draw hotter molten metal 26 directly from main chamber 18. As shown, the pump PU is located in an opening in a wall 12 between an intermediate or circulation well 20 adjacent to the charge well 22, or adjacent to a passageway 24 in wall 13 leading to main chamber 18, wherein the molten metal 26, coming indirectly or directly from the main chamber 18, is hotter than it is in the charge well 22, where a new charge of metal chips 80 is periodically or continuously introduced. The inert gas bubbles IG actuating, propelling, or driving the pump PU enter the conveying conduit or conduits CC at the lower end LE thereof and exit at the upper end or exit port UE thereof, the inert gas IG provided by gas feed means including inlet port I, pipe P, and exit port E, entering the pump PU and the conveying conduit(s) CC thereof at or near the lower end LE thereof. Exiting from the upper end UE of the pump PU is a combination 26/IG of the molten metal and the inert gas bubbles propelling the same. The upper end or exit port UE of the pump PU and the conveying conduit(s) CC thereof is directed tangentially at the periphery of the circular inner cavity 22IC of the charge well, thus creating a vortex of molten metal within the said inner cavity of the charge well between the point of introduction of the molten metal at or near the top thereof from the exit port or upper end UE of the inert gas bubble-actuated molten metal pump PU to the exit port 24E of the charge well, also oriented tangentially with respect to the periphery of the inner cavity and at or near the bottom thereof. The molten metal coming from the exit port UE of the inert gas bubble-actuated molten metal pump is therefore directed into the molten mass within the charge well into which a new charge of metal chips 80 is introduced and thus into vortical moving contact with the said metal chips. Since the molten metal 26 entering the charge well 22 is at a higher temperature and hotter than the molten metal 26 in the charge well 22 itself, and certainly has a higher temperature than the new charge of metal chips 80 introduced by the metal chip charger 100, as shown the preferred mass flow gravity feed furnace charger 50, although the same principles are in effect and similar results are attained regardless of the type of charger employed, the new charge of metal chips 80 being fed into the charge well 22, upon subjection to contact with the vortically-moving hotter molten metal, melts rapidly into the molten metal mass 26 in the charge well 22 of the furnace. In addition, rather than being wasted to the outside, the inert gas IG used to actuate the inert gas bubble-molten metal pump PU can be captured in the charge well 22 beneath the charge well-cover 30, which may if desired conveniently be a floating cover, thereby providing a non-oxidizing atmosphere of inert gas IG at the surface of the molten metal mass 26 in the charge well 22 and beneath said cover 30. Alternatively, the chip charger may be removed or eliminated from its position superposed above the charge well, either alone or together with the heat- and flame-resistant cover, thereby providing access to the inner chamber of the charge well for larger pieces of scrap. Alternatively again, the cover may be allowed to remain in place atop the surface of the molten mass in the charge well, thereby continuing to provide a non-oxidizing atmosphere at the surface of the molten metal mass in the charge well while, at the same time, when provided with an aperture therein, additional metal scrap may be introduced into the inner cavity of the charge well through the said aperture in any convenient manner.

Thus, according to the method and employing the apparatus of the present invention, the necessary circulation of molten metal in the metal melting furnace is efficiently effected. In addition, the inert gas employed is used not only as the actuator or propellant for the inert gas bubble-actuated molten metal pump PU but, due to combination of pump PU with a heat-resistant and flame-resistant cover above the exit port of the pump PU and the conveying conduit CC thereof and over at least a substantial portion of the molten metal, may be captured beneath the said cover and utilized to create a highly desirable non-oxidizing atmosphere at the surface of the molten metal and beneath the said cover, thereby presenting an overall highly efficient and yet highly economical arrangement of apparatus and method for the circulation of molten metal throughout the various chambers of the metal-melting furnace, and for the establishment and maintenance of a non-oxidizing atmosphere at the surface of the molten metal mass and beneath the heat-resistant and flame-resistant cover over the surface of the molten metal mass therein.

More importantly, a novelly-configured charge well having an internal cavity which is substantially circular when viewed from the top, and advantageously cylindrical or conical in nature, is provided by the present invention which, together with the inert gas bubble-actuated molten metal pump, which brings hotter molten metal from an adjacent section or from the main chamber of the furnace to the charge well and has its exit port oriented tangentially to the periphery of the cavity at an upper level thereof, create a vortex of molten metal within the cavity for the more rapid and efficient melting of metal chips or scraps into the molten metal therein, the said cavity also having a tangentially-oriented outlet or exit port for exit of molten metal therefrom and into the main chamber of the furnace at a lower level thereof, the said procedure being assisted if desired by providing a head of molten metal in the internal cavity, preferably but not necessarily with the aid of an exit port from a lower level of the charge well into the furnace main chamber of restricted inner cross-sectional area. When combined with a heat and flame-resistant cover above the cavity, especially a cover with an aperture for the feeding of a fresh charge of metal chips or scraps into the cavity, and especially when the cover is surmounted by a gravity-feed chip charger for the feeding of metal chips and scraps into the said cavity through the said aperture, the apparatus and method of the present invention bring the efficiency of the melting of metal chips or scraps into the melt or pool of a metal melting furnace to new and previously unattainable levels.

IN GENERAL

The method and apparatus of the present invention is particularly adapted for use in connection with the melting and recycling of nonmagnetic metal scrap such as brass, aluminum, aluminum alloys, and the like, and such nonmagnetic metal scrap may conveniently be separated from a mass of metal scrap including also ferrous, ferric, or other magnetic chips by the employment of magnetic separation means, as is now well known and established in the art.

The conveying conduit of the invention as well as the gas feed means of the invention are generally constructed of high-temperature molten metal-resistant ceramic, graphite, silica, or silicon carbide or the like, and the hangers and support columns supporting the same within the metal mass are bonded thereto as by welding, clamping, or ceramic or adhesive bonding around the exterior thereof or in some cases may be molded into the ceramic, graphite, silica, or silicon carbide material of construction, or in some cases may even be of mild or stainless steel or such steel coated or plated with a refractory material.

As used herein, the term "actuated", with reference to the inert gas bubble "actuated" molten metal pump, means that the pump is put into action by the inert gas. Synonymously, the pump could be said to be driven, propelled, or powered by the inert gas bubbles.

As used herein, the term "metal chips" means metal chips or scrap of any type or description as is conventionally used in the art for charging into the charge well of a metal melting furnace, and includes aluminum, magnesium, titanium, brass, iron, or steel, or an alloy thereof, or a metal for alloying one of said metals, such as silicon, iron, copper, magnesium, or strontium.

Where, in this Specification and claims, molten metal, a molten metal mass or pool, and "metal chips" are referred to, the type of metal comprising the molten metal pool has already been described, and the term "metal chips" is to be understood as encompassing metal chips of various almost unlimited proportions, configurations, and dimensions, but particularly as including small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously-unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the method and apparatus of the invention, whether new metal or previously used metal, including even and especially new and used aluminum sheet and can scrap, when it is determined that such further processing into new metal is required or desired by the operator.

It is thereby seen from the foregoing that the objects of the present invention have been accomplished and that a novel, efficient, and economic method and apparatus have been provided, all in accord with the Objects of the Invention and the Summary of Invention as set forth hereinbefore.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

I claim:

1. In a metal-melting furnace having a main chamber and a charge well, the combination of a charge well comprising an internal cavity having a substantially circular cross section when viewed from the top,
    an inert gas bubble-actuated molten metal pump having its entry port outside of said charge well in another area or section of said metal-melting furnace and its exit port tangentially arranged with respect to the periphery of said cavity at or near the top of the charge well,
    said charge well having an exit port or outlet for molten metal into the main chamber of said metal-melting furnace tangentially arranged with respect to the periphery of said cavity at or near the bottom of said charge well.

2. The combination of claim 1 wherein said cavity has the configuration of a substantially vertically-oriented cylinder.

3. The combination of claim 1 wherein said cavity is of decreasing circumference so as to be of the nature of a cone with a downward apex.

4. The combination of claim 3 wherein said cone has stepped sidewalls.

5. The combination of claim 1 comprising heat-and flame-resistant cover means over said internal cavity.

6. The combination of claim 5 wherein said cover means is adapted to fit into said cavity and to substantially cover the surface of the molten metal when contained in said cavity.

7. The combination of claim 6 wherein said cover means comprises an aperture for the feeding of metal chips or scrap therethrough and into the cavity of said charge well.

8. The combination of claim 7 comprising a chip charger in association with said aperture for the feeding of metal chips and scrap into said cavity through said aperture.

9. The combination of claim 8 wherein said chip charger is a gravity-feed metal chip charger.

10. The combination of claim 9 wherein said chip charger comprises a vertically-oriented conduit for forming a substantially vertically oriented column of metal chips or scrap within and above said aperture and is adapted to discharge metal chips or scrap from said column through said aperture and into said cavity.

11. The combination of claim 1 wherein the pump comprises an elongated conveying conduit having a lower end and an upper end, at least a portion of said conduit being inclined upward from the horizontal.

12. The combination of claim 11 wherein said conveying conduit has an inert gas and molten metal inlet at or adjacent its lower end and an inert gas and molten metal outlet at its upper end.

13. The combination of claim 1 wherein said pump is set in a wall between the charge well and an adjacent well of said metal-melting furnace.

14. The combination of claim 13 wherein said pump is set in an opening in said wall with its lower end in said adjacent well and its upper end at or in said charge well.

15. The combination of claim 11 wherein said elongated conveying conduit is angled with an upper portion substantially horizontal and a lower portion extending downwardly at an angle to the horizontal.

16. The combination of claim 13 wherein said conveying conduit is molded in or routed out of a block of molten metal- and high temperature-resistant refractory material.

17. The combination of claim 16 wherein the refractory material is a graphite, ceramic, silica, or silicon carbide material.

18. The combination of claim 1 wherein the entry port of said inert gas bubble-actuated molten metal pump is located so as to draw molten metal, when present in the main chamber of the metal-melting furnace, directly from said main chamber.

19. The combination of claim 1 wherein the exit port of said charge well has a restricted internal cross-sectional area.

20. The combination of claim 19, wherein the exit port of said charge well into the main chamber of the metal-melting furnace has an internal cross-sectional area 1 to 20 times the internal cross-sectional area of the pump conduit or conduits.

21. A method for the rapid and efficient melting of metal chips or scrap in a metal melting furnace having a main chamber and a charge well, comprising the following steps:
    providing a charge well comprising an internal cavity having a substantially circular cross section when viewed from above, and
    providing an exit port for exit of molten metal out of said charge well and into the main chamber of said metal melting furnace tangentially-oriented with respect to the periphery of said cavity at a lower level of said charge well, providing an inert gas bubble-actuated molten metal pump having its lower end located outside of said charge well in another area or section of said metal-melting furnace for entrance of hotter molten metal thereinto from a hotter area or section of said metal-melting furnace and its exit port for exit of molten metal therefrom oriented tangentially to the periphery of said cavity at an upper level of said charge well, causing molten metal to enter said inert gas-actuated molten metal pump and then to enter said cavity tangentially at an upper level of said charge well and causing molten metal from said cavity to exit said cavity tangentially at said lower level of said charge well, thereby creating a vortex of molten metal within the cavity of said charge well, and providing metal chips or scraps to said charge well.

22. The method of claim 21 wherein said cavity is in the form of a substantially vertically-oriented cylinder.

23. The method of claim 21 wherein said cavity is in the form of a cone having a decreasing circumference and a downward apex.

24. The method of claim 23 wherein said cone has stepped sidewalls.

25. The method of claim 21 wherein metal chips or scraps are introduced into said cavity and enter into said vortex for rapid and efficient melting into the molten metal therein.

26. The method of claim 25 including the step of providing heat and flame-resistant cover means for said charge well to retain inert gas therebelow.

27. The method of claim 26 including the step of providing an aperture in said cover means and introducing metal chips or scrap into said cavity through said aperture.

28. The method of claim 25 including the step of providing metal chip-charger means for introducing metal chips or scraps into said cavity and introducing said metal chips or scraps thereinto.

29. The method of claim 27 wherein said introduction is effected using gravity feed metal chip charger means.

30. The method of claim 21 wherein the pump comprises an elongated conveying conduit having a lower end and an upper end, at least a portion of said conduit being inclined upward from the horizontal.

31. The method of claim 30 wherein flow of molten metal in said conveying conduit is effected by means of inert gas introduced into said conveying conduit at or adjacent its lower end and rising up the incline therein to emerge at its upper end.

32. The method of claim 21 wherein said pump is set in a wall between the charge well and an adjacent well in said metal-melting furnace.

33. The method of claim 32 wherein said pump is set in an opening in said wall with its lower end submerged in molten metal in said adjacent well and its upper end in said charge well.

34. The method of claim 30 wherein said elongated conveying conduit is angled with an upper portion substantially horizontal and a lower portion extending downwardly at an angle to the horizontal.

35. The method of claim 21 wherein the molten metal and the metal chips charged into the charge well comprise aluminum, magnesium, titanium, brass, iron, or steel, or an alloy thereof, or a metal for alloying one of said metals.

36. The method of claim 25 wherein the charge of metal chips or scraps is provided by means of a mass flow gravity feed metal chip charger.

37. The method of claim 21 wherein the entry port of said inert gas bubble-actuated molten metal pump is located so as to draw molten metal directly from said main chamber.

38. The method for the rapid and efficient melting of metal chips or scrap in a metal melting furnace having a main chamber and a charge well, comprising the following steps:

providing a charge well comprising an internal cavity having a substantially circular cross section when viewed from above, and providing an exit port for molten metal out of said charge well and into the main chamber of said metal melting furnace tangentially-oriented with respect to the periphery of said cavity at a lower level of said charge well, providing an inert gas bubble-actuated molten metal pump having its lower end located outside of said charge well in another area or section of said metal-melting furnace for entrance of hotter molten metal thereinto from a hotter area or section of said metal-melting furnace and its exit port for exit of molten metal therefrom oriented tangentially to the periphery of said cavity at an upper level of said charge well, causing molten metal to enter said inert gas-actuated molten metal pump and then to enter said cavity tangentially at an upper level of said charge well and causing molten metal from said cavity to exit said cavity tangentially at said lower level of said charge well, thereby creating a vortex of molten metal within the cavity of said charge well, and providing metal chips or scraps to said charge well, including the step of creating a head of molten metal in the charge well to assist vortical movement of molten metal therein and circulation of high temperature molten metal throughout the metal-melting furnace.

39. The method of claim 38 wherein the exit port of said charge well has a restricted internal cross-sectional area.

40. The method of claim 39, wherein the exit port of said charge well into the main chamber of the metal-melting furnace has an internal cross-sectional area 1 to 20 times the internal cross-sectional area of the pump conduit or conduits.

41. The combination of claim 19, wherein the exit port of said charge well into the main chamber of the metal-melting furnace has an internal cross-sectional area 2 to 10 times the internal cross-sectional area of the pump conduit or conduits.

42. The method of claim 39, wherein the exit port of said charge well into the main chamber of the metal-melting furnace has an internal cross-sectional area 2 to 10 times the internal cross-sectional area of the pump conduit or conduits.

* * * * *